Aug. 16, 1960     E. C. POLIDOR     2,949,057
OPTICAL GEAR ANALYZING MEANS
Filed Sept. 20, 1954     14 Sheets-Sheet 1

Aug. 16, 1960

E. C. POLIDOR 2,949,057

OPTICAL GEAR ANALYZING MEANS

Filed Sept. 20, 1954

Aug. 16, 1960     E. C. POLIDOR     2,949,057
OPTICAL GEAR ANALYZING MEANS
Filed Sept. 20, 1954     14 Sheets-Sheet 3

Aug. 16, 1960

E. C. POLIDOR 2,949,057

OPTICAL GEAR ANALYZING MEANS

Filed Sept. 20, 1954

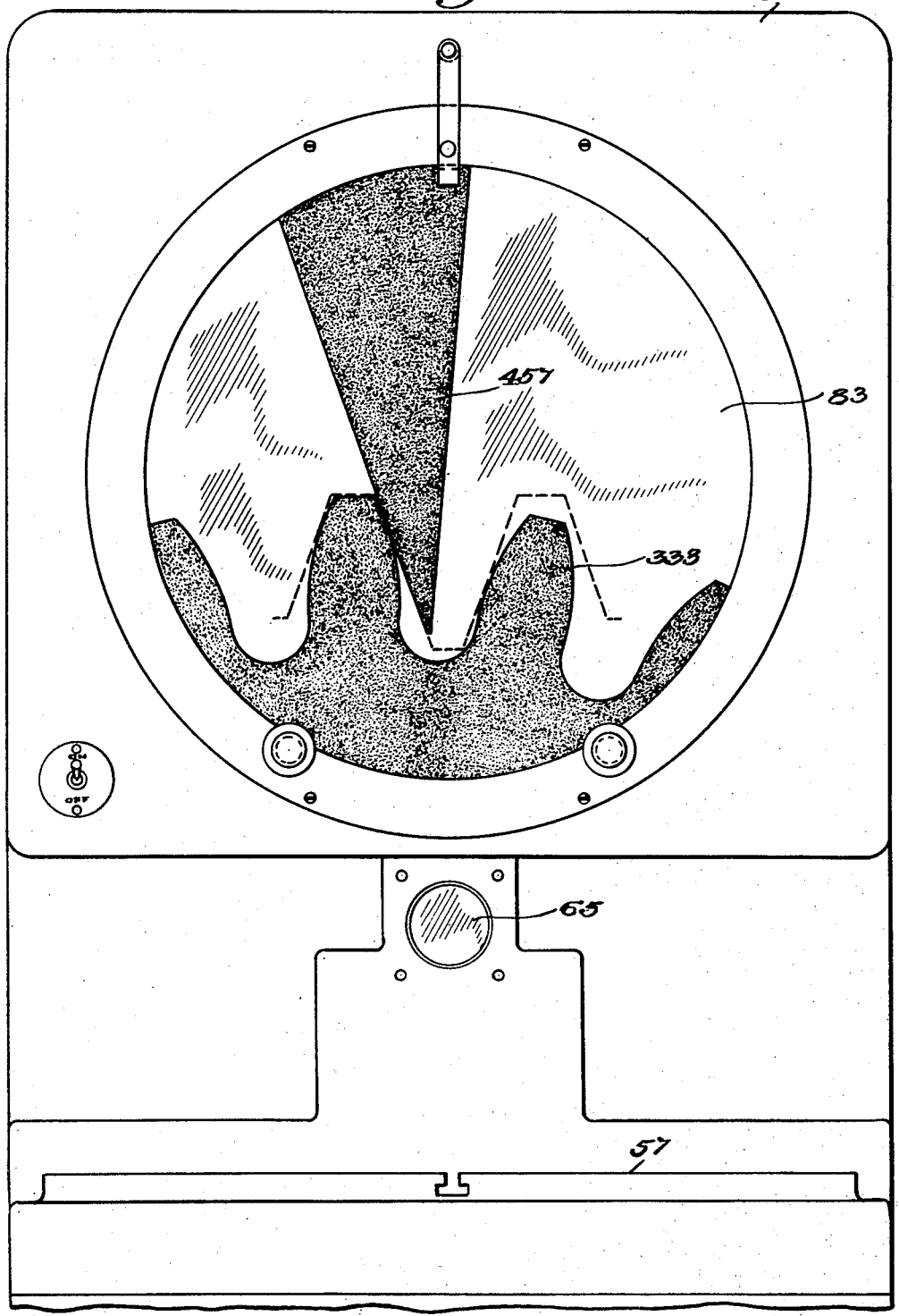

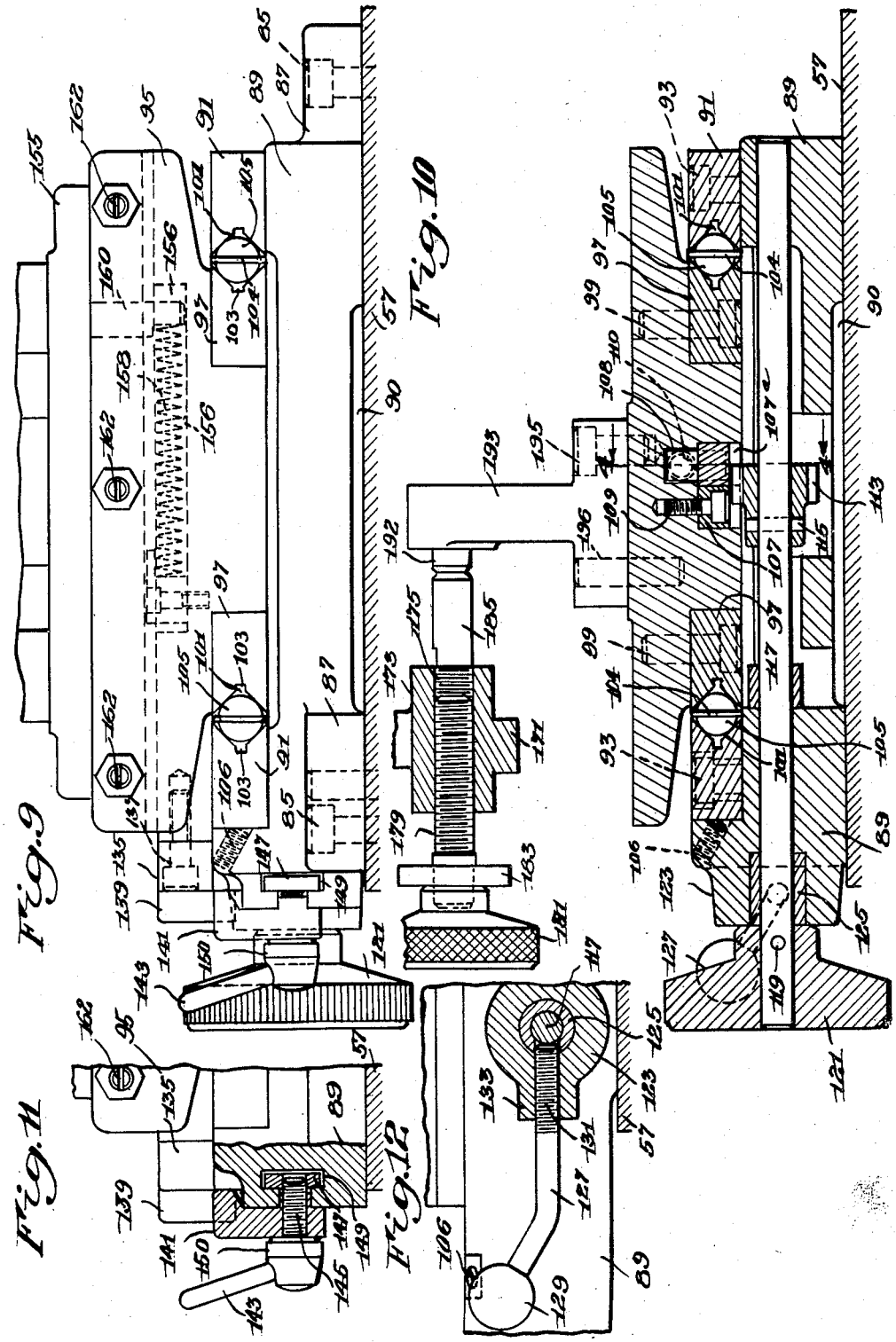

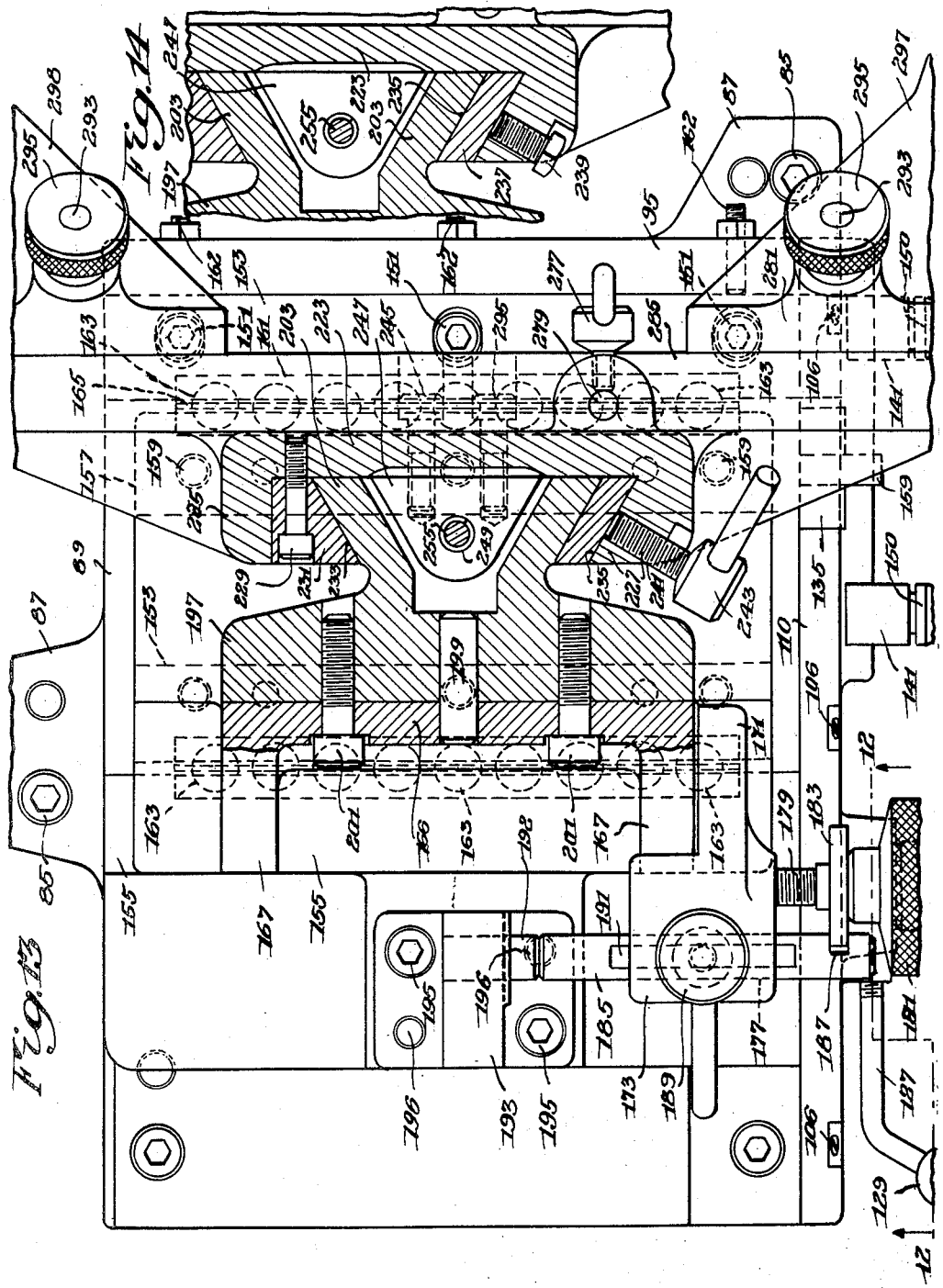

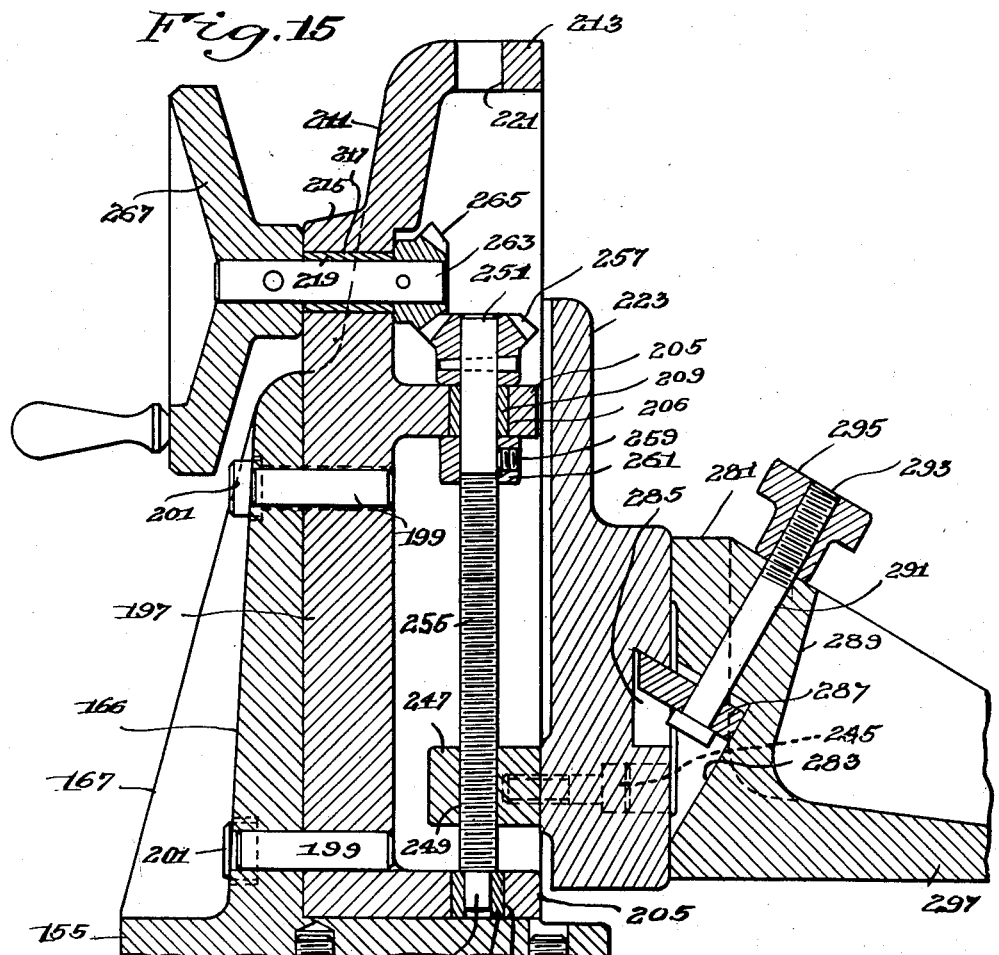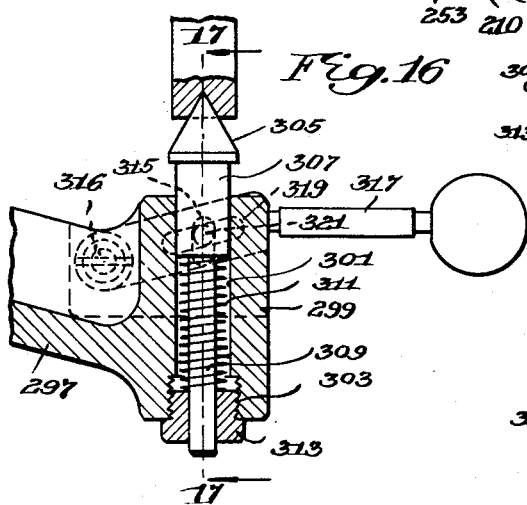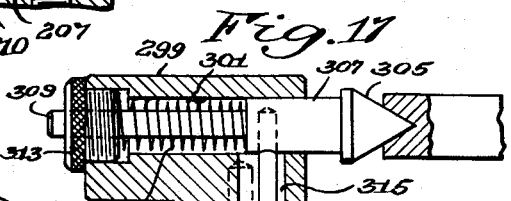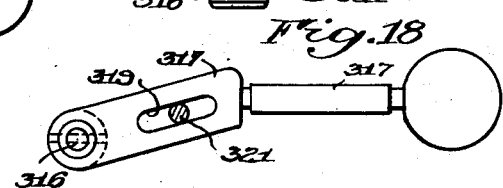

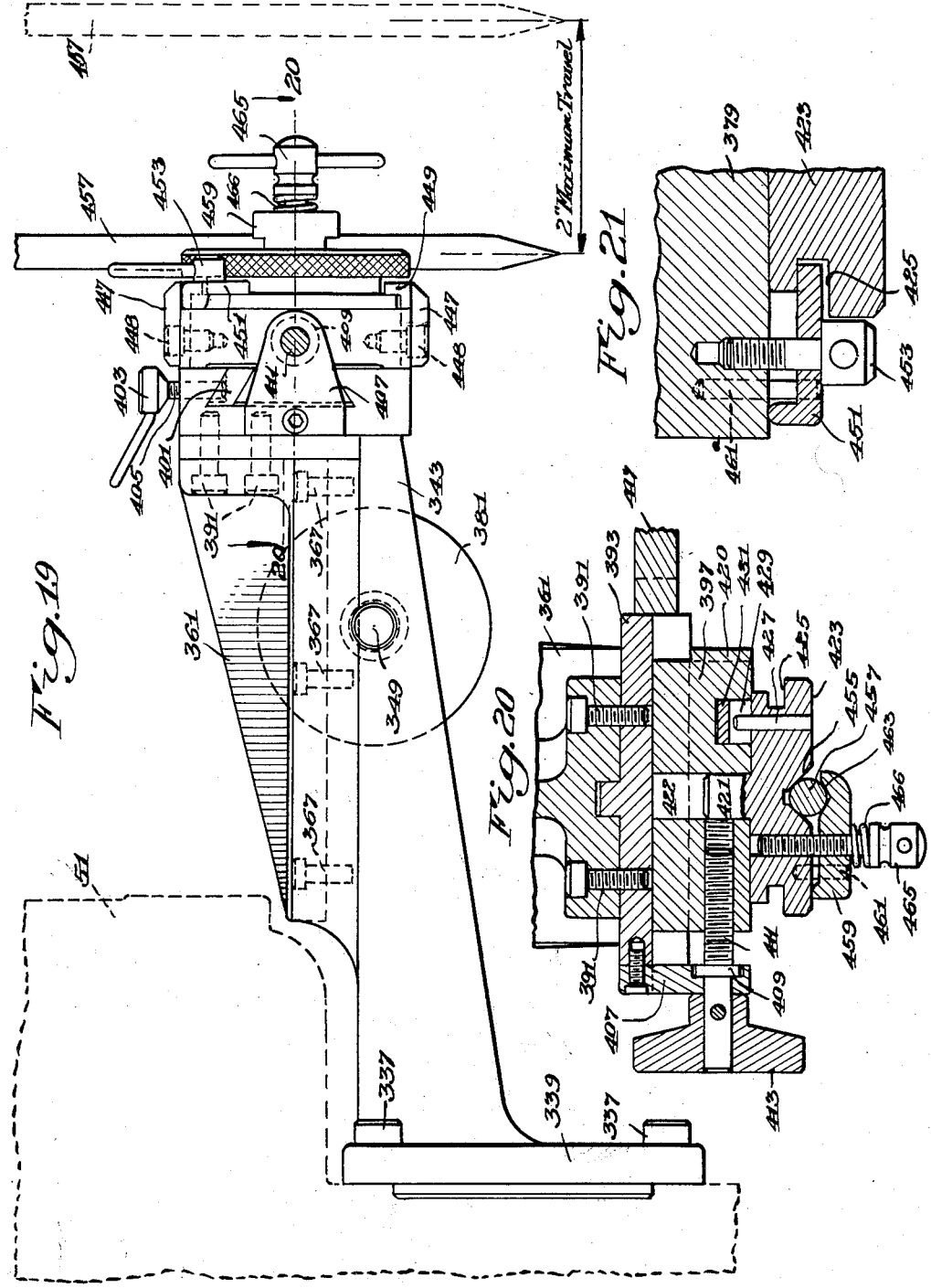

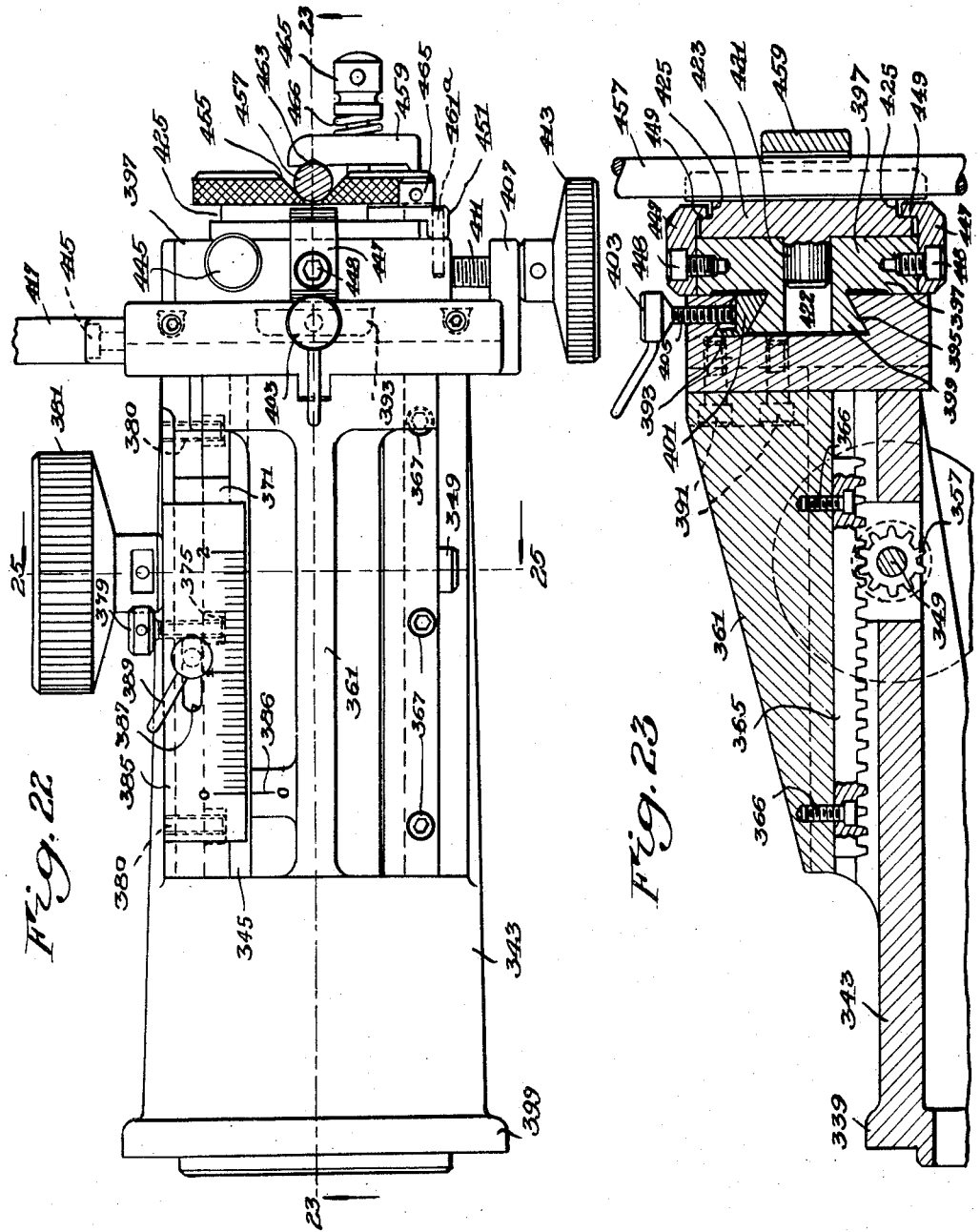

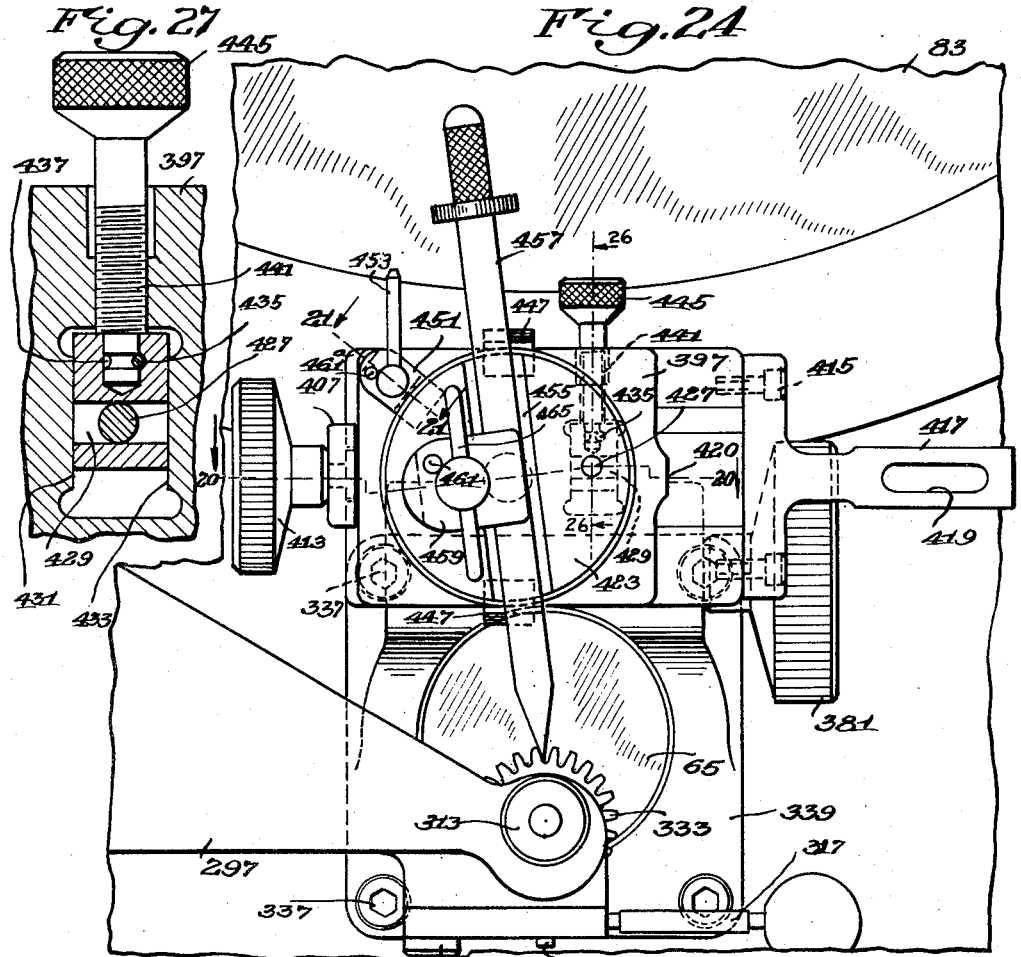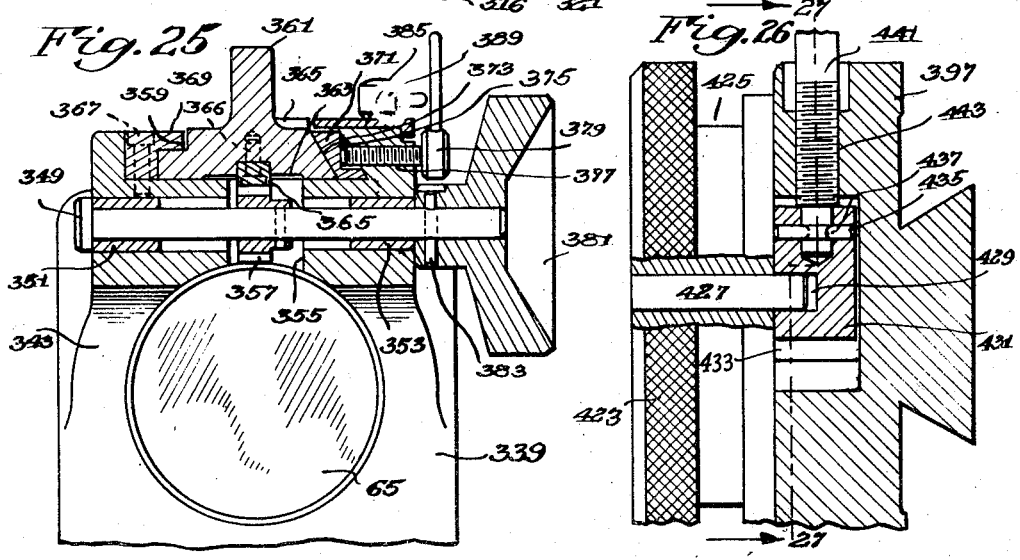

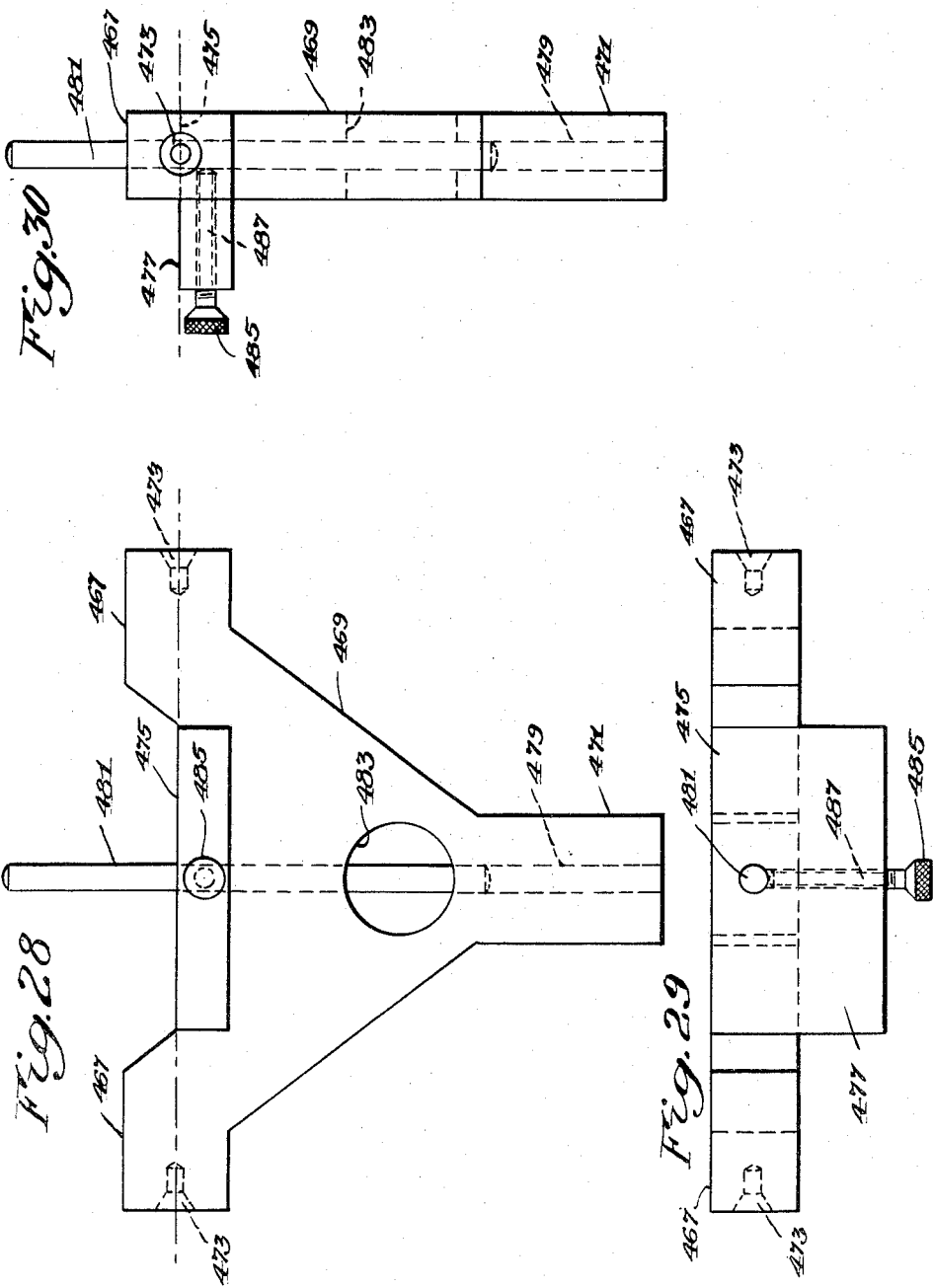

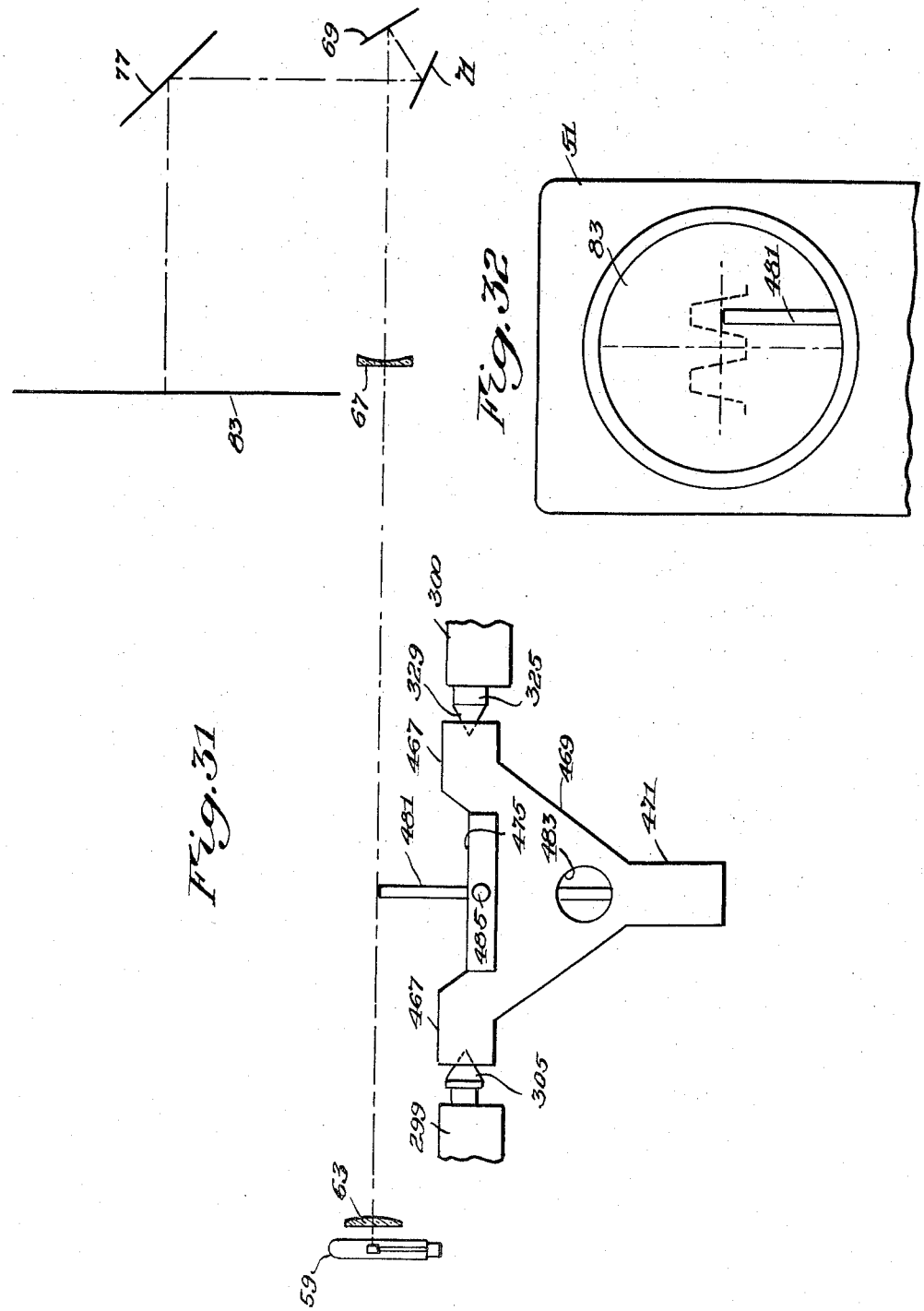

United States Patent Office 2,949,057
Patented Aug. 16, 1960

2,949,057

OPTICAL GEAR ANALYZING MEANS

Edward C. Polidor, Irondequoit, N.Y., assignor to Optical Gaging Products, Inc., a corporation of New York Filed Sept. 20, 1954, Ser. No. 457,114

8 Claims. (Cl. 88—24)

The invention relates to a gear analyzing device which facilitates optical inspection and gaging of gears under simulated operating conditions.

An object of the invention is to provide a generally improved and more satisfactory gear analyzing device.

Another object is to provide a gear analyzing device which permits simultaneous visual inspection of various gear characteristics while a gear is under simulated operating conditions.

Still another object is to provide an apparatus having alinement means for accurately alining an analyzer staging fixture with the analyzer optical comparator gage chart.

A further object is to provide a gear analyzer for use with involute spur gears of various sizes.

A still further object is to provide a gear analyzer capable of precise gear gaging and permitting the user quickly to identify, evaluate, and measure gear tooth elements and characteristics.

A still further object is to provide a gear analyzer which can be easily, quickly, and economically operated with a minimum of training and which will yield consistent results with little or no maintenance.

These and other desirable objects may be attained in the manner disclosed as an illustrative embodiment of the invention in the following description and in the accompanying drawings forming a part hereof, in which:

Fig. 2 is a top plan of the staging fixture with the rack pin supporting arm and associated parts omitted;

Fig. 7 is an enlarged front elevation of a portion of the optical comparator showing a gear image projected onto a gear chart-gage;

Fig. 9 is a right side elevation of a fragment of the staging fixture operating head;

Fig. 10 is a vertical section taken approximately on the line 10—10 of Fig. 3;

Fig. 11 is a fragmentary vertical section taken through a portion of the operating head base approximately on the line 11—11 of Fig. 3;

Fig. 12 is a vertical section taken approximately on the line 12—12 of Fig. 13;

Fig. 13 is a horizontal section taken through a portion of the staging fixture operating head with a portion thereof broken away;

Fig. 14 is a horizontal section taken through a portion of the operating head vertical guide means;

Fig. 15 is a longitudinal vertical section taken through a portion of the staging fixture operating head;

Fig. 16 is a horizontal section taken through the operating head support center;

Fig. 17 is a central vertical section of the operating head support center taken approximately on the line 17—17 of Fig. 16;

Fig. 18 is a plan view of the support center operating arm;

Fig. 19 is a left side elevation of the rack pin supporting arm;

Fig. 20 is a horizontal section through the forward part of the rack pin supporting arm, taken approximately on the line 20—20 of Figs. 19 and 24.

Fig. 21 is a section taken approximately on the line 21—21 of Fig. 24.

Fig. 22 is a top plan of the rack pin supporting arm with a portion thereof broken away;

Fig. 23 is a longitudinal central vertical section through the rack pin supporting arm, taken approximately on the line 23—23 of Fig. 22;

Fig. 24 is a front elevation of the rack pin supporting arm, showing also a rack pin supported thereby, a gear in analyzing position meshing with the rack pin, and part of the operating head and comparator;

Fig. 25 is a transverse vertical section through the same, taken approximately on the line 25—25 of Fig. 22;

Fig. 26 is a vertical section taken approximately on the line 26—26 of Fig. 24;

Fig. 27 is a vertical section taken approximately on the line 27—27 of Fig. 26;

Fig. 28 is a front elevation of the analyzer alinement gage or setting fixture;

Fig. 29 is a top plan of the alinement gage shown in Fig. 28;

Fig. 30 is a right side elevation of the structure shown in Fig. 28;

Fig. 31 is a diagrammatic view showing the alinement gage in use;

Fig. 32 is a front elevation of a portion of the optical comparator with an image of the alinement pin projected onto a chart-gage.

The same reference numerals throughout the several views indicate the same parts.

Prior to the present invention industry has, in general relied heavily upon the mechanical methods for gear gaging. While these procedures have been satisfactory to a degree, they have certain drawbacks in that inspection entailed a considerable amount of time and expense and was dependent upon the mechanical "feel" of different highly skilled men in the final inspection, thereby giving rise to inconsistent results both in the inspection as to the gear accuracy and in the measurement of any deviations from the true size or shape of the gear.

The optical gear analyzer of the present invention minimizes the human element in the inspection process and permits various critical gear tooth elements and characteristics of involute spur gears to be inspecaed simultaneously by an inspector who has undergone limited training and supervision. In addition to providing reliable results, the gear analyzer enables the gaging to be accomplished while the gear is under simulated operating conditions (except for speed and load), thereby enabling the inspector to observe visually the gear reactions and to eliminate the various assumptions which were required in prior gaging methods to predict the gear reactions while in operation.

In the preferred form of the invention, the gear analyzer includes an optical comparator, a staging fixture, a chart gage, and a gear analyzer alinement gage or setting fixture.

Figure 6:
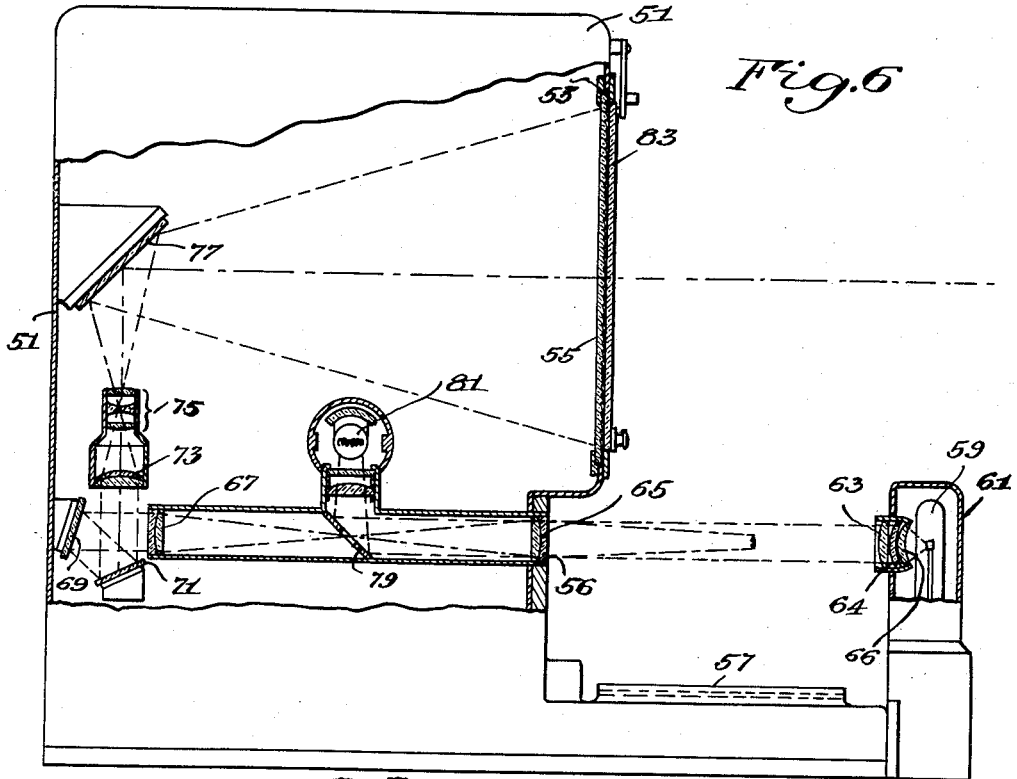
Fig. 6 is a left side elevation of the optical comparator with a portion of the comparator wall broken away, showing the comparator optical projection and magnifying system.

The optical comparator, diagrammatically shown in Fig. 6, may be of any suitable conventional construction, as for example that disclosed in the United States patents to Turner et al., 2,552,238, and Hudak 2,552,280. The comparator has an enclosing cabinet structure 51 with an opening 53 on its forward face in which is secured a transparent viewing screen 55, preferably having on its rear or inner face a series of light-intensifying flutes of the general Fresnel type, such as frequently used on photographic camera focusing screen plates and as shown for example in French Patent 895,484 to Zeiss Ikon A.G. Disposed forwardly of and below the screen 55 is a work table 57 on which is fixed a gear staging device operating head. Positioned below the screen 55 and above the lens opening 56 is a rack pin supporting arm which is fixed to the front face of the comparator housing structure.

In use, the gear to be inspected is held by the analyzer operating head. Projection of the gear image onto the screen 55 is accomplished by directing light from the lamp 59, in the lamp housing 61, through the condenser lenses 63, 64 and 66 to illuminate the gear profile. The light rays passing the gear are then focused by lenses 65 and 67 onto the reflectors 69 and 71. From the reflector 71, the rays pass through field lens 73 and the objective lens 75 to the reflector 77 from which they are projected onto the viewing screen 55. The focusing and magnifying lenses 65 and 67 are of equal focal length and are spaced apart a distance equal to the sum of their focal lengths. Disposed in the mutual focal plane of the lenses 65 and 67 is a ring-shaped reflector 79 which permits light from the lamp 59 to pass through its central opening and reflects light from the lamp 81 through the lens 65 to illuminate the rear surface of the gear held in the staging fixture.

On the outer face of the comparator screen 55 is removably interchangeably positioned a translucent or semi-transparent gear chart or gage 83 on which is accurately scribed an outline to be compared visually with the projected magnified outline or silhouette of the particular gear to be inspected. It is within the scope of this invention to inscribe on the chart or gage 83 the correct theoretical outline (enlarged or magnified suitably) of two or more teeth of the gear to be analyzed. However, according to the preferred form of the invention, the chart or gage 83 is inscribed, not with the outline of the gear teeth, but rather with the outline of the theoretical basic rack with which the gear teeth would properly mesh, and the outline or shape of the teeth is checked or analyzed mainly by actually "running" the gear against one rack tooth or simulated rack tooth and by observing the projected outline of the running or moving gear, with relation to the basic rack inscribed on the chart.

Figure 8:
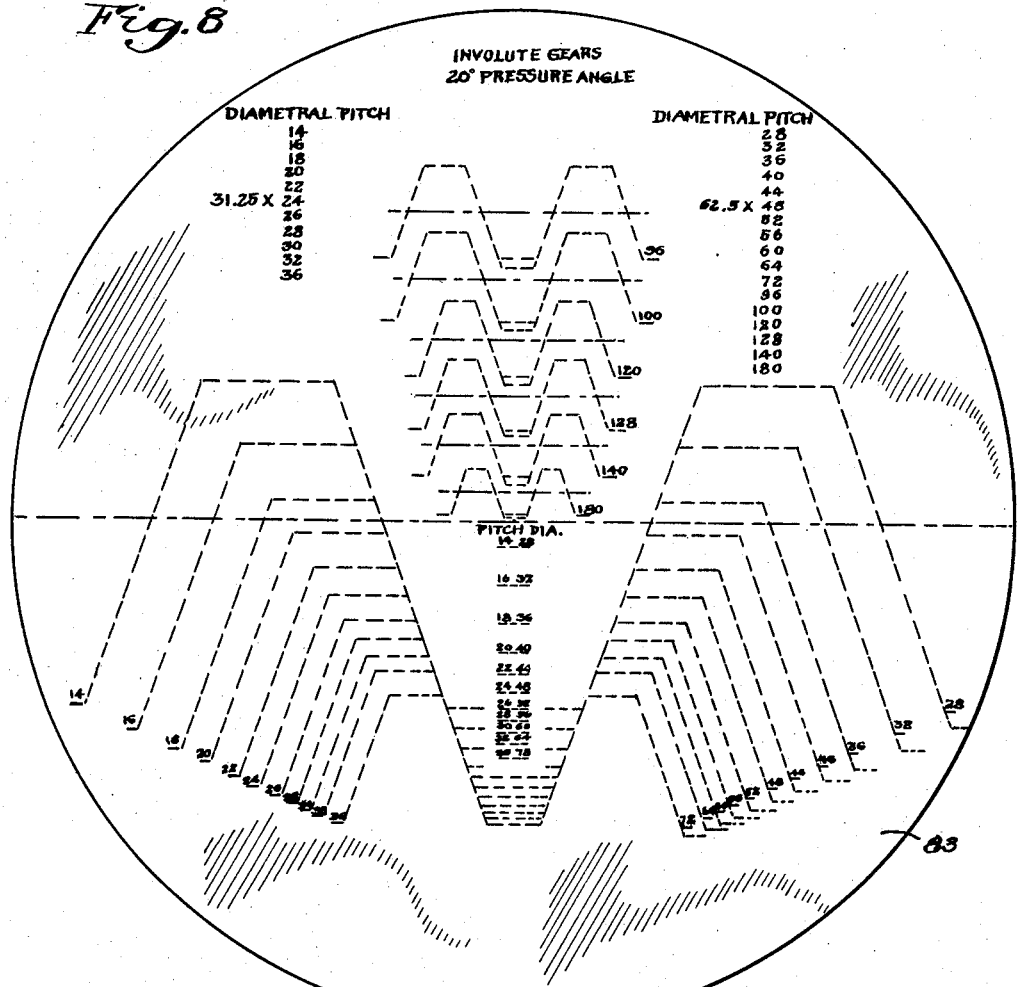
Fig. 8 is a front elevation of a typical gear chart constituting part of the present invention.

This use of a chart inscribed with the shapes of basic rack teeth rather than gear teeth, is an important feature. One advantage is that it enables the use of a single inscribed rack for testing all gears having the same diametral pitch and pressure angle, regardless of the diameter of the gear or the number of teeth thereon. If gear teeth, rather than rack teeth, are inscribed on the testing chart or gage, it is necessary to have a separate set of inscribed gear teeth for each different diameter of gear to be tested, notwithstanding that the gears may have the same diametral pitch. Another advantage is that the rack teeth, having straight sides rather than curved sides, may be more accurately inscribed on the test chart than is possible with gear teeth, which require curved sides. A third advantage is that the basic rack teeth, with their straight sides and angular formation, lend themselves more readily than gear teeth to being placed in nesting relationship with other teeth of the same pressure angle but different diametral pitch, whereby a great number of tooth formations of different diametral pitches may be placed on the same test chart or gage, without undue crowding or interference with clarity. Thus a single chart 83 may be inscribed with all the rack teeth needed for analyzing and testing ordinary involute gears having a given pressure angle (e.g., 20 degrees) of all commonly encountered diametral pitches (e.g., 14 to 180), regardless of the diameter of the gear to be tested. An example of such a test chart or gage 83 is shown in Fig. 8, and it can be well appreciated that this single chart, according to the present invention, performs functions that would otherwise require many separate charts if gear teeth rather than rack teeth were inscribed, and if there were no way of actually rolling or "running" the gear against a rack tooth or simulated rack tooth.

Figure 3:
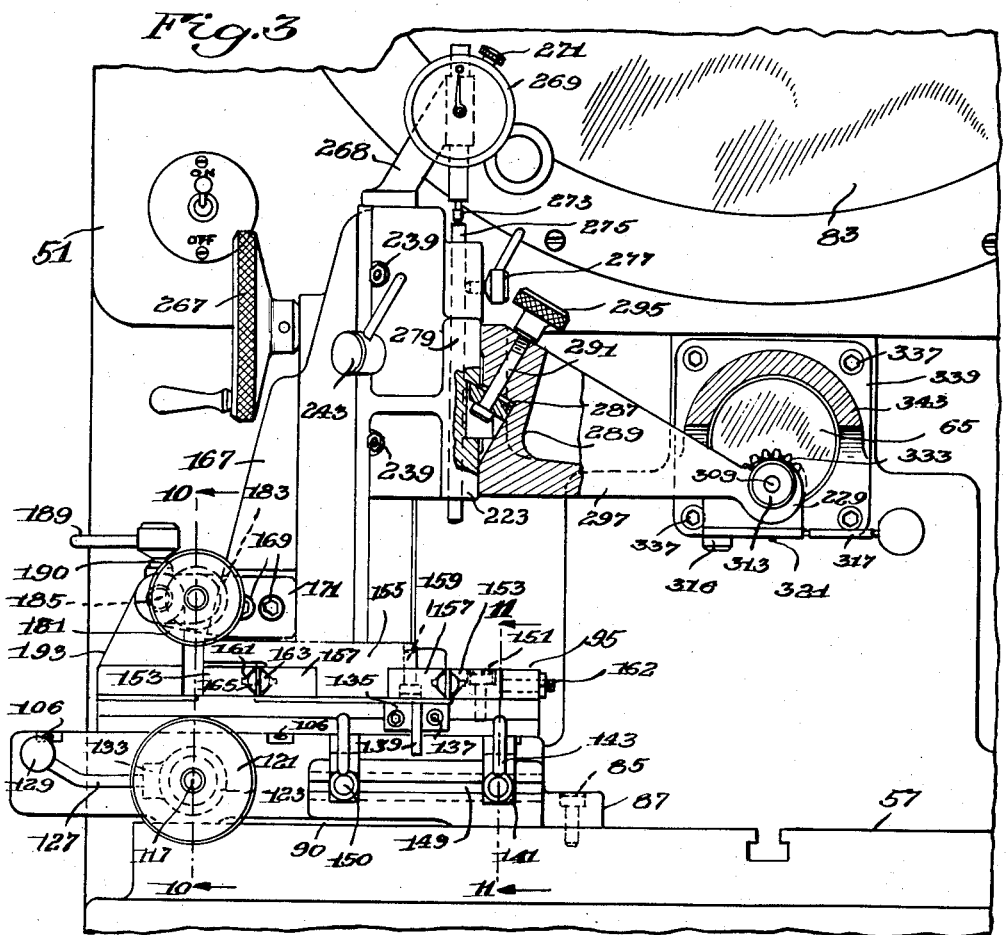
Fig. 3 is a front elevation similar to Fig. 1 with the staging fixture on an enlarged scale, a portion of the optical comparator being broken away.
Figure 5:
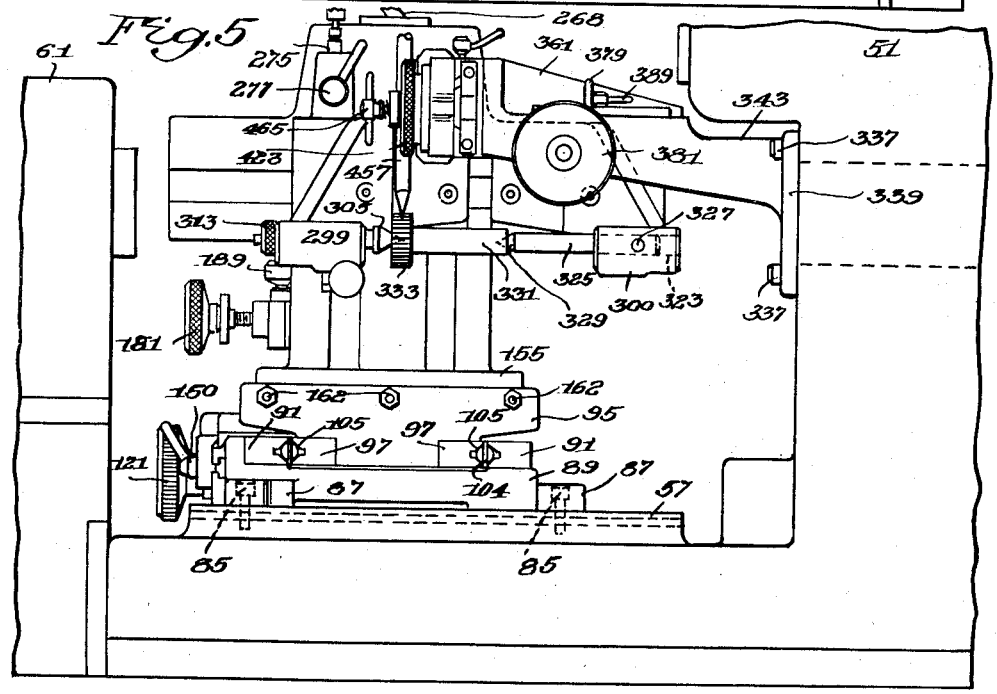
Fig. 5 is a right side elevation of the gear analyzer with a portion of the optical comparator broken away.

As shown in general in Figs. 3 and 5, and in greater detail in Figs. 9 and 10, the operating head of the staging fixture is mounted on the comparator work table 57 by bolts 85 which extend through ears 87 on the operating head base plate 89. The bottom central area of the base plate 89 is recessed at 90 whereby only the base plate bottom face areas adjacent the longitudinal edges contact the work table. To facilitate parallel contact between the work table and the base plate 89, the engaging surfaces are provided with finished true surfaces. On the top or upper face of the base plate 89 are a pair of transversely spaced longitudinally extending guide bars or rails 91 which are fixed in parallel relationship by bolts 93 threaded into the base plate 89 with their upper ends flush with the top or upper face of the guide bars. Disposed between the longitudinal guide bars 91 is a movable T-shaped longitudinal carriage 95 having along its bottom longitudinal edges, in parallel and confronting relation to the guide bars 91, a pair of guide bars or rails 97 which are retained on the carriage by bolts 99 threaded upwardly into the carriage 95 and with their lower ends flush with the bottom face of the guide bars 97. The adjacent confronting edges of the longitudinal guide bars 91 and 97 are each provided with a longitudinally extending V-shaped groove 101 having a rectangular slot 103 at its apex, extending the full length of the bar. Arranged edgewise vertically in the clearance space between the two rails 91 and 97 of each set is an elongated rectangular cage bar 104 extending along the rails and having openings for receiving a series of ball bearings 105 and holding them in properly spaced relation to each other along the V-grooves 101.

Thus the carriage is mounted for movement along the guide rails 91, riding on the ball bearings 105, the rails preferably being adjusted so as to pre-stress the balls under slight compression, to eliminate all side play. This may be accomplished by fastening one of the guide bars or rails 91 (such as the rear one, or right hand one when viewed as in Fig. 10) in fixed position on the base 89, by means of its respective bolts 93, while the other one of the rails 91 (the left hand one when viewed as in Fig. 10) has a slight range of adjusting movement on the base 89, its bolt hole being slightly larger than its bolts 93. A series of lateral adjusting screws 106 are spaced at intervals along the length of this front or left hand guide rail 91, three such screws being seen in Fig. 14, and are threaded obliquely downwardly and rearwardly through the upstanding front edge of the base 89 (see Figs. 9 and 10) so that the rear ends of the screws bear against the front edge of the guide rail. When the parts are being initially assembled, or are being readjusted to take up play caused by wear the bolts 93 of the front rail 91 are left slightly loose until the screws 106 are adjusted to produce the desired degree of prestress on the bearing balls 105. Then the bolts 93 are tightened.

Figure 4:
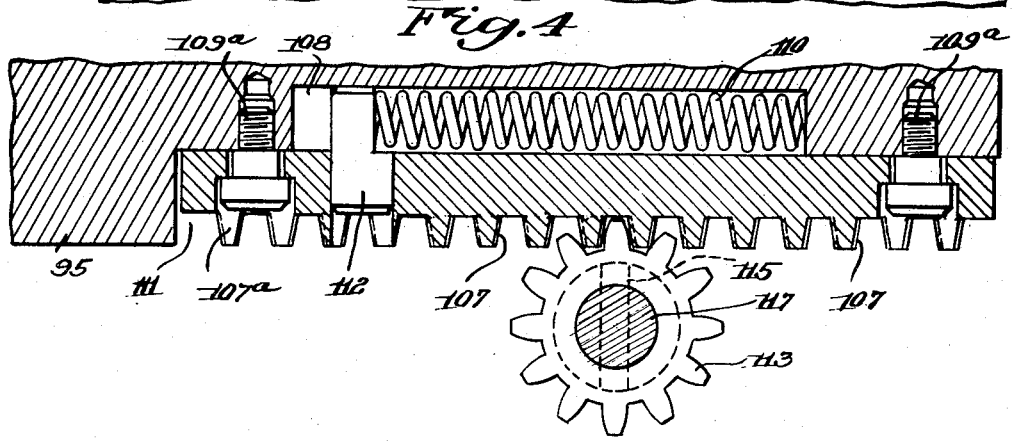
Fig. 4 is a central vertical section taken through the rack and pinion for moving the lower carriage of the operating head, taken substantially on the line 4—4 of Fig. 10.

To facilitate movement of the carriage 95 along the base plate 89, the carriage is provided with longitudinally extending central rack means meshing with an operating pinion. The rack means is made up of two similar racks 107 and 107a (Fig. 10) placed side by side in a recess 111 of the carriage. The rack 107 is secured rigidly therein by bolts 109 extending upwardly through holes in the rack. The companion rack 107a is secured by bolts 109a which pass through holes in the rack which are slightly larger than the bolts, to enable limited longitudinal movement of the rack. Above the rack 107a is another recess 108 (Figs. 4 and 10) containing a coiled compression spring 110 which presses at one end against the end of the recess and at the other end against an upstanding pin 112 fixed to the rack 107a, thus constantly tending to move the rack 107a longitudinally relative to the rack 107, to the slight extent permitted. A wide spur gear 113 meshes with both racks, and is fixed by a pin 115 to a transverse shaft 117 which is journaled in the base plate and has one end extending outward therefrom. On this end of the shaft 117 is secured, by setscrew 119, a turning knob 121. A boss 123 formed integrally with the base plate surrounds the shaft just behind the knob 121, and has a bearing sleeve 125 pressed into it to serve as a bearing for the shaft. To lock the carriage 95 with respect to the base plate, there is provided a locking screw 127 having an appropriate handle or operating member 129 at one end and a male thread 131 at its other end which is screwed into a female threaded projection 133 integral with the boss 123, and which passes through the bearing sleeve 125 to engage and lock the shaft 117, when the screw is tightened. Due to the manner in which the rack 107a is mounted and is pressed by the spring, all backlash between the pinion and the rack means is eliminated.

Supported on the forward edges of the base plate and carriage (see Figs. 1, 3, 9, and 11) are stop means for limiting the longitudinal movement of the carriage relative to the base plate. The stop means includes a lug 135 secured by screws 137 to the forward edge (the left edge when viewed as in Fig. 9) of the carriage 95 and having a downwardly extending ear 139 which is adapted to abut the longitudinally adjustable base plate stops 141 to limit the longitudinal movement of the carriage 95 to any desired stroke. To facilitate the adjustability, the stops are retained in position on the front or left longitudinal edge of the base plate, as viewed in Fig. 9, by means of handles 143, each of which has a shank 145 passing through an opening in a stop 141 and threaded into a nut 147 positioned within an undercut or T-shaped groove 149 formed in a longitudinal edge of the base plate. As seen from Fig. 11, once a stop 141 is located in the desired position, rotation of the handle 143 causes the inner face of the shank head 150 to urge the stop 141 against the edge of the base plate to lock the stop frictionally in immovable position. Since the groove 149, as seen in Fig. 3, is of considerable length, the stops 141 can be adjusted to various positions to obtain the desired degree of longitudinal movement of the carriage 95.

On the top surface of the carriage 95 are secured, by bolts 151, a pair of laterally spaced guide bars or rails 153 extending at right angles to the direction of the lower rails 91, between which rails 153 is disposed a carriage 155 having a pair of guide bars or rails 157 fixed thereto by bolts 159. The guide bars or rails 153 and 157 are in confronting relationship and the adjacent opposing edges of the rails are provided with V-grooves 161 similar to those provided in the guide bars 91 and 97. Within each pair of adjacent grooves 161 are several ball bearings 163, kept in proper spaced position relative to each other by being received in openings in a cage bar 165 positioned in the clearance space between the rails 153 and 157, similarly to the cage bars 104 previously mentioned.

Just as in the case of the ball bearings for the lower carriage 95, the ball bearings for the upper carriage 155 are likewise pre-stressed or pre-loaded to eliminate any lateral play. This is done in a manner similar to that employed for the lower carriage. The left hand one of the two rails 153 is bolted in fixed position to the top of the carriage 95, while the right hand rail 153 is slightly adjustable laterally of its length, its bolt holes being somewhat larger than the holding bolts 151 which extend through them. Adjusting screws 162 (Figs. 3 and 9) threaded approximately horizontally through an upstanding flange on the carriage 95 press against the outer edge of the right hand one of the guide rails 153, and may be used to load or stress the ball bearings 163 to any desired degree, before the bolts 151 of this right hand rail 153 are fully tightened.

Spring means are provided to tend to move the upper carriage 155 constantly rearwardly along the rails 153, that is, in a direction toward the main comparator housing 51, or rightwardly when viewed as in Fig. 5. To this end, the upper surface of the lower carriage 95 is provided with an elongated slot or groove 156 (Fig. 9) located midway between and parallel to the rails 153. In this groove is a coil compression spring 158 reacting at its forward end against the forward end of the groove, and at its other end pressing rearwardly against a pin 160 fixed to the upper carriage 155 and depending downwardly into the groove 156. The carriage 155 can easily be pulled manually in a forward direction, against the force of the spring 158, but whenever the carriage is released, the spring will move it rearwardly as far as permitted by adjustable stop means.

The upper carriage, which has heretofore been designated by the numeral 155 applied to the lower part thereof, comprises also an upstanding structure including a vertical flange 166 integral with the lower part 155 and having a right vertical face which is parallel to the tracks or rails 153 and 156, and also two stiffening ribs or flanges 167 (Figs. 3, 13, and 15) extending leftwardly from the front and rear ends of the flange 166 and likewise integral with the parts 155 and 166. The adjustable stop means for limiting rearward movement of this carriage 155, 166 comprises a laterally extending bracket arm 171 (Figs. 3 and 13) secured to the forward one of the ribs 167 by bolts 169. The left end of this bracket arm has an enlarged part 173 containing two bores 175 and 177, parallel to each other and to the carriage rails 153 and 157, the bore 175 being threaded and the bore 177 being smooth.

Threaded into the aperture 175 is an adjusting or actuating screw 179 having a knurled turning knob 181 at its forward end and an annular flange or circular collar 183 fixed on the screw 179 just behind the knob 181. Guided in the smooth bore 177 is a sliding stop rod 185 having near its forward end a lateral slot 187 within which is seated a peripheral portion of the circular collar 183. When the knob 181 is turned to screw the screw 179 further into or out from its bore 175, the axial travel of the collar 183, engaging the notch 187, will cause corresponding axial travel of the stop rod 185, which rod may be locked in any desired position of adjustment by tightening a locking handle 189 on a clamping screw 190 threaded into the part 173, the lower end of which screw is adapted to engage with a flat side 191 on the rod 185 to fix the rod in place. The rear end of the stop rod 185 cooperates with a fixed abutment on the lower carriage 95. Such abutment is formed, for example, by a rod 192 (Figs. 10 and 13) axially alined with the rod 185 and fixed in a bracket 193 which is secured on the top face of the carriage 95 by bolts 195 and dowel pins 196, The lower carriage 95 may be referred to also as the transverse carriage, since the direction of its movements along its guideways or rails 91, 97 is horizontal and transverse to the horizontal optical axis of the beam of gaging light projected rearwardly from the lamp 59 past the work to be gaged and into the comparator housing. Similarly the upper carriage 155, 166 may be called also the longitudinal carriage, since it moves along its guideways or rails 151, 157 in directions parallel to or longitudinal with respect to the optical axis of the gaging light beam. On this upper or longitudinal carriage are mounted guideways or rails for a third carriage which moves vertically, so that it may conveniently be called the vertical carriage. The three carriages together, along with their appurtenances, may be referred to collectively as the staging fixture.

Merely for convenience of manufacture, the guideways or rails on which the vertical carriage moves are preferably not attached directly to the parts 155, 166 of the longitudinal carriage, but are on a separate part 197 resting on the flat bed of the carriage 155 and tight against the upstanding flange 166 thereof, being secured in fixed position on the flange 166 by dowel pins 199 and bolts 201. On the right hand face of this part 197 are a pair of vertical guide portions 203 which diverge outwardly to form a dovetail tenon. Between the guide portions 203 are a pair of vertically spaced flanges 205, the lower one of which rests on the top face of the transverse carriage. The flanges 205 are provided with alined apertures 206 and 207 having bushings 209 and 210 for supporting a vertical carriage adjusting shaft described hereinafter.

The carriage portion 197 has an obliquely upstanding portion 211 which extends above the top edge of the support plate 165 and terminates in an approximately horizontal flange 213 integral with the top edge of the portion 211 and extending to a position lying vertically above the flanges 205. In this horizontal flange 213 is an opening 221 for supporting a gage mount as described hereafter. On the upstanding portion 211 is a projection or boss 215 through which extends an opening 217 having its axis horizontal and intersecting the common axis of the bushings 209 and 210. Within the opening 217 is a bushing 219 forming a bearing for an actuating shaft for the vertical carriage, as described below.

Mounted for sliding movement on the vertical guideway portions 203 is the above mentioned vertical or third carriage, having a main wall 223 and a pair of vertical flanges 225 and 227 (Fig. 13) formed integrally with the wall 223 and extending towards the member 197. Within the corner formed by the flange 225 and the carriage wall 223 is fixed, by bolts 229, a vertical guide bar or gib 231 having an inclined face 233 which engages the outer face of one of the guideway portions 203. The inner face 235 of the flange 227 is disposed at an acute angle to the plane of the carriage wall 223 and lies parallel to but spaced from the outer face of the other of the vertical guideway portions 203. Located between the carriage flange face 235 and the outer face of the adjacent guideway portion 203 is a vertical guide bar or gib 237 which is pressed toward the adjacent guide rail 203, to a degree sufficient to eliminate side play, by bolts 239. At approximately right angles to the gib 237 is an opening 241 which extends through the flange 227, and threadedly receives a locking handle 243 which is adapted, when rotated in one direction, to have its inner end urged the gib 237 tightly against the vertical guideway portion 203 and lock the vertical carriage frictionally in a fixed position.

Secured by bolts 245 to the vertical carriage wall 223 between the flange 225 and 227 is an approximately triangular lug 247 which is disposed between the vertical carriage guideway portions 203 and the flanges 205. The lug 247 has a threaded opening 249 which is in vertical alinement with the apertures in the bushings 209 and 210.

To move the vertical carriage upwardly and downwardly along its vertical guideway or track 203, a shaft 251 passes vertically through the opening in the flange bushing 209, and has a reduced lower end 253 seated in the bushing 210. A threaded central portion 255 of the shaft is engaged by the threaded opening 249 in the lug 247. Above the top face of the upper flange 205 a bevel gear 257 is pinned to the shaft, and adjacent the bottom surface of the same flange 205 is fixed, by setscrews 259, a collar 261 which prevents upward movement of the shaft. The bevel gear 257 meshes with and is driven by a bevel gear 265 on a horizontal actuator shaft 263 journaled in the bushing 219 and carrying at its left end an operating hand wheel or crank 267, by which the shafts 263 and 251 are turned to raise or lower the vertical carriage.

The horizontal flange 213 of the vertical guideway (see Figs. 1 and 3) supports a gage bracket 268 by volts extending downwardly through the gage bracket and the openings 221 (Fig. 15) in the horizontal flange 213. A dial indicator gage 269 of the usual commercial kind commonly used by machinists, is adapted to be detachably fastened on the bracket 268 by the usual fastening screw (not shown) extending through a suitable vertical slot in the bracket 268 and into a threaded opening in the back of the gage. The gage has a calibrated dial, an indicating arm or pointer, a dial setting knob 271, and a downwardly extending plunger 273 for operating the pointer in the usual manner. When set in proper position on the bracket 268, the lower end of the plunger contacts with the upper end of a rod 275 which is adjustably secured by the threaded lock 277 in a vertical opening 279 extending through the vertical carriage. When thus mounted, the dial indicator gage 269 may be used to measure the extent of vertical movement of the vertical carriage necessary to produce certain results, thereby measuring the extent of various types of gear inaccuracies. The same dial indicator 269 may be removed from the bracket 268 and mounted elsewhere for measuring other types of inaccuracies, as explained below.

Mounted for horizontal sliding movement on the wall 223 of the vertical carriage are a pair of independently movable transversely spaced work support arms 297 and 298 which extend rightwardly in diverging relation to each other (see Figs. 2, 5, 13, and 15). Each arm is mounted on the vertical carriage in the same manner, so a description of one mounting will serve for both.

The arm 297 has at its left end a vertical wall 281 the machined left face of which abuts the machined right face of a thickened lower portion of the vertical carriage wall 223. Running the whole length of this wall 223, in the thickened part thereof, is a horizontal groove 285, the lower edge of which is substantially horizontal, the upper edge being inclined obliquely to provide an undercut or dovetailed mortise groove. In the wall 281 of arm 297, opposite the lower part of the groove 285, is a rectangular groove 282, in which is fastened a rectangular key or guide bar 284 which projects beyond the left face of the wall 281 and extends into the groove 285, resting upon the lower edge thereof to support the arm 297 against downward movement relative to the vertical carriage wall 223. About midway of the length of the groove 282, this groove is interrupted by an enlarged V-shaped recess sufficiently large to contain an oblique lug 287 fastened to a threaded shank or stud 293 extending obliquely upwardly through a bore 291 in a portion 289 of the arm 297. The projecting upper end of the stud 293 carries a knurled nut 295 which, when tightened, draws upwardly on the stud 293 and lug 287, clamping this lug firmly against the oblique upper edge or face of the groove 285, thus clamping the arm 297 against horizontal movement along the groove 285 and at the same time drawing the left face of the wall 281 firmly against the right face of the wall 223 and seating the lower face of the bar 284 firmly against the lower edge of the groove 285.

The free ends of the respective work support arms 297 and 298 are provided with approximately circular body portions 299 and 300, respectively, which are in axial alinement in a direction parallel to the horizontal optical axis of the gaging beam of light.

Axially of the body portion 299 (see Figs. 16–18) is an opening 301 which opens into an enlarged concentric threaded opening 303 formed at one end of the portion 299. A support or mounting center, having a conical point 305 of a diameter greater than that of the opening 301, an intermediate portion 307 having a diameter making a snug sliding fit in the opening 301, and a shank portion 309 of a diameter considerably less than that of the intermediate portion 307, extends through the body portion openings 301 and 303 with the conical point adjacent the opening 301 and the shank portion 309 extending outwardly from the opening 303. A spring 311 is coiled about the shank portion 309 of the support center and presses forwardly against the shoulder formed between the portions 307 and 309, reacting rearwardly against a centrally apertured nut 313 threaded into the opening 303.

The body portion 299 has a slot 315 extending through its bottom wall and elongated in a direction parallel to that of the opening 301. Pivotally supported on the support arm 297 at 316 and extending below the body portion 299 (see Fig. 18) is a center operating arm 317 having an elongated slot 319, which has its longitudinal axis disposed directly below and at an angle to the longitudinal axis of the slot 315 in the body portion 299. A vertical pin 321, fixed to the support center intermediate portion 307, extends through the slots 315 and 319, whereby the operating arm 317 may be swung on its pivot 316 to urge the pin 321 along the slot 319 and thus retract the center 305 relative to the body portion 299, against the force of the spring 311.

The body portion 300 on the free end of the other support arm 298 has an axial opening 323 alined with the openings 301 and 303 of the body portion 299. A second mounting center member 325 is positioned within the opening 323 and fixed to the body portion 300 by a cross pin 327. This second center is also provided with a conical point 329 which is in confronting relation to the conical point 305 of the center supported by the arm 297. As further explained below, the two centers 305 and 329 serve for mounting or staging the gear to be analyzed, by engaging in axial center holes at the ends of the shaft or mandrel 331 on which the gear 333 is mounted. In some cases, when the gear is provided with an integral hub, the conical mounting centers may engage directly with the bore in the hub, mounting on a separate shaft or mandrel being unnecessary. The axial movability of the center 305 accommodates shafts of slightly different lengths within a limited range. The clamping nuts 295 may be loosened and the supporting arms 297 and 298 may be shifted to various positions on the vertical carriage 223, to accommodate gear shafts of materially different lengths, or to position the mounting shaft in such location in an end-wise direction that the gear thereon may be brought to the focal plane of the optical projection system.

The transverse carriage, longitudinal carriage, vertical carriage, and supporting arms 297 and 298, with associated parts, constitute that portion of the staging fixture which holds the gear in the analyzing light beam, as will be apparent from what has been said above, and may be called broadly the gear holding means. Another important portion of the staging fixture constitutes means for holding a rack tooth or simulated rack tooth in stationary position in engagement with a tooth of the gear being analyzed, so that the gear may be actually "run" against the rack tooth, being turned by contact therewith when the gear or its mounting shaft is moved laterally with respect to the optical axis and the stationary rack tooth. This portion of the staging fixture may be called broadly the rack holding means, and will now be described with reference particularly to Figs. 19–27.

The main supporting arm 343 of this portion of the fixture is fastened to the lower part of the front wall of the comparator casing by bolts 337 which pass through bolt holes in the rear face plate 339 of the arm and are threaded into the casing, the arm 343 extending forwardly in cantilever fashion. The arm is approximately in the form of a cylindrical tube with the lower part of its wall cut away obliquely (see Figs. 3 and 19), the axis of the tube being coincident with the optical axis of the analyzing light beam passing from the lamp 59 to the lens 65, the rear plate 339 being centrally apertured to permit passage of the light beam.

The upper wall of the arm 343, near its forward end, is thickened as seen in Fig. 19, so that various guideways and bearings may be formed therein. A shaft 349 extends transversely through the upper wall and is journaled in bushings 351 and 353, for rotation. Along the longitudinal center of the support 343 and spaced inwardly from the ends thereof is a slot 355 within which a pinion gear 357 is keyed to the shaft 349. Mounted in a recess 359 in the top surface of the support 343 is a longitudinal carriage 361 having in its bottom surface a recess 363 in which a gear rack 365 is rigidly fixed by bolts 366 (Fig. 23), the rack meshing with the pinion gear 357.

Within the recess 359 along the left longitudinal edge of the carriage 361 is secured by bolts 367 a longitudinal gib or guide bar 369 overlying a lip on the carriage. Along the opposite or right longitudinal edge of the carriage 361 is another gib or guide bar 371 which has an inclined longitudinal edge 373 engaging with a corresponding edge on the carriage. The opposite longitudinal edge of the locking bar 371 has a portion parallel with the edge 373, and a right angular grooved portion 375 approximately midway of its length. The portion of the support 343 adjacent to the grooved portion 375 is provided with a transverse opening 377 into which is threaded a locking screw 379. Adjusting screws 380 (Fig. 22) bear against the gib 377 near the ends thereof, to a sufficient extent to prevent side play of the carriage.

On the outer end of the shaft 349 a turning knob 381 is secured by a pin 383, whereby rotation of the knob 381, acting through the gear 357 and rack 365, causes movement of the carriage 361 between the guide bar 369 and locking bar 371. As shown in Fig. 19, the carriage 361 has a travel of approximately two inches. When the carriage 361 is in a desired longitudinal position, the locking screw 379 is tightened against the locking bar 371 which in turn bears against the inclined face of the longitudinal carriage and thereby locks the carriage in place.

On the top surface 345 of the support 343, as shown in Figs. 22 and 25, is a scale 385 for measuring the longitudinal movement of the carriage 361 relative to the support 343. The scale is adapted to be longitudinally aligned with suitable calibrated marking such as the index mark 386 provided on the longitudinal edge of the carriage adjacent the scale, and fixed in position by the handle 389 on a clamping screw which passes through the scale slot 387 and is threaded into the support 343.

Across the forward end of the longitudinal rack tooth carriage 361 (see Figs. 20 and 23) is secured, by bolts 391, a transverse guide plate 393 having on its front face a horizontally extending dovetail groove 395. A transverse rack tooth carriage 397 is movably mounted on the transverse guide plate 393 by a dovetail tenon 399 extending from the rear face of the transverse carriage into the guide plate dovetail groove 395. The dovetail tenon 399 has a width less than that of the dovetail groove 395 to permit an elongated approximately horizontal locking wedge 401, having an inclined edge which mates with the upper edge of the dovetail tenon 399, to be positioned between the upper edge of the dovetail tenon 399 and the dovetail groove 395. A locking screw 403 extending through the top face of the guide plate is threadedly received in an opening 405 which connects with the dovetail groove 395, whereby the locking wedge 401 can be urged against the upper edge of the dovetail tenon 399 by the locking handle 403 and thereby fix the transverse carriage in position.

On one of the vertical edges of the guide plate 393 (see Figs. 20 and 22) is fixed a forwardly extending ear 407 having an aperture 409 disposed transversely therethrough. A shaft 411 having a knob 413 fixed to one end extends rotatably through the aperture 409 and is threadedly received in an opening formed in the lateral carriage. Turning the shaft 411 moves the transverse carriage (when the locking wedge 401 is in released position) since the shaft 411 is held against longitudinal movement in the ear 407.

On the opposite vertical edge of the guide plate 393, as shown in Fig. 24, is fixed, by bolts 415, a rightwardly extending lug 417 having a longitudinal slot 419 which may receive the usual clamping screw on the back of the dial indicator gage 269, with the operating stem of the gage extending to bear against a flat anvil portion 420 at the right end of the transverse carriage 397, if it is desired to remove the gage from the bracket 268 and mount it in position to measure lateral horizontal displacement of the carriage 397 under certain inspecting or analyzing procedures.

An approximately circular face plate 423 has an integral pin 421 extending rearwardly from its rear face and fitting snugly but rotatably into a central bore 422 in the transverse rack tooth carriage 397, thus forming an axis (parallel to the optical axis of the gaging beam) on which the face plate 423 may rotate. This face plate has a peripheral groove 425 between its front and rear faces. A pair of hook-like dogs 447 are secured to the top and bottom faces of the transverse carriage 397 by bolts 448, each dog having a flange 449 which rides in the peripheral groove 425 of the face plate (see Fig. 23) to maintain the face plate snug against the front face of the carriage 397. A pin 427 (Figs. 20 and 26) located off-center in relation to the face plate axis, extends through the face plate 423 and into a horizontal slot 429 formed in a vertically sliding block 431 which is disposed in a vertical slot 433 in the front face of the transverse carriage 397. The block is moved upwardly and downwardly (thereby turning the plate 423 on its pivotal axis 421) by turning a knurled knob 445 at the top of a screw 441 threaded through a vertical tapped bore 443 in the carriage 397, the bottom end of the screw being operatively connected to the block 431 as by means of a peripheral groove 437 in the screw engaged by a pin 435 in the block 431.

Locking of the face plate in a desired setting is accomplished by a locking ear 451 (Figs. 21, 22, and 24) which is secured to the tranverse carriage front face by a clamipng screw 453 and is held against rotation thereon by a pin 461a. One end of the locking ear extends into the face plate peripheral groove 425 while the other end has a flange as shown, to contact with the front face of the transverse carriage.

The front face of the face plate 423 is provided with a diametrical V-shaped groove 455 (see Figs. 20 and 22). An elongated rack pin 457, having its lower end conical at least on one side (although the other side of the cone may be ground away for additional clearance in getting between the teeth of small gears) is adjustably mounted in the groove 455 (see Figs. 19, 20, and 22–24) and is held therein in any desired position of longitudinal adjustment by an L-shaped clamping lug or ear 459 pivotally mounted eccentrically on the front face of the face plate 423 by pin 461. In operative position the L-shaped ear has one flange bearing against the front face of the plate 423 and the other flange overlying the rack pin 457. This other flange has on its rear face a V-shaped rack pin engaging groove 463, so that the pin 455 lies in and is engaged by both grooves 455 and 463. A clamping screw 465 provided with a T-shaped handle passes through the lug 459 and is threaded into the face plate, to tighten the lug 459 against the rack pin 457. Preferably a coiled compression spring 466 surrounds the clamping screw 465 between the head thereof and the lug 459, to keep some degree of pressure of the lug against the rack pin even when the clamping screw is loosened, thus preventing accidental falling out of the rack pin.

These various adjustable parts enable the rack pin 457, simulating and in effect constituting one tooth of the theoretical rack for meshing with the gear being checked and analyzed, to be turned to any desired angle about the rotary axis 421 (parallel to the optical axis of the system and to the gear axis defined by the conical supporting centers 305 and 329), to be moved up and down relative to the optical axis (by loosening the clamping screw 465), to be traversed laterally relative to the optical axis (by turning the knob 413 to shift the transverse carriage 397) and to be shifted in a direction parallel to the optical axis (by turning the knob 381 to shift the longitudinal carriage 361) to place it either directly in, or in front of or behind, the focal plane of the optical system. Thus great flexibility of operation is provided by this portion (the rack supporting portion) of the staging fixture.

To assist in setting up the staging fixture and adjusting the various parts thereof in preparation for an inspecting and analyzing operation on gears of any particular size, it is desirable to provide the operator with a master setting fixture or setmaster. It is important, in setting up the apparatus, to have the gear supporting centers 305 and 329 set at such elevation that when the gear is mounted on these centers, the theoretical pitch circle of the gear will come exactly tangent to the pitch circle mark or line on the chart or optical gage 83 mounted on the comparator screen. To facilitate such setting, there is provided the setmaster or alinement fixture seen in Figs. 28–31.

The alinement fixture preferably has an approximately Y-shaped configuration formed by a pair of centering arms 467, a tapered body portion 469, and a vertical shank portion 471. While alinment devices utilizing shapes other than that described may be employed, the configuration of the alinement device shown has been designed to facilitate ease in operation and storage and saving in materials and workmanship without any sacrifice in the efficiency of the device. The ends of the centering arms 467 are provided with central centering holes 473 which are adapted to receive the conical support centers 305 and 329. The top surface 475 of the body portion 469 is accurately machined to form a true surface which lies in a plane passing through the centering holes 473. Integrally fixed to one side of the body portion 469 is a gage block support 477, the top surface of which is in coplanar relationship with the body portion top surface 475 and is also provided with a true surface. This portion 477 constitutes, in effect, a lateral extension or enlargement of the surface 475. Centrally of the body portion top surface 475, and extending vertically through the body portion 469 and shank portion 471, is an opening 479 in which is disposed an alinement pin 481 having a rounded upper end. To insure accurate alinement of the staging device, it is essential that the opening 479 be positioned at right angles to the body portion top surface 475 and that a snug slip fit exist between the opening 479 and pin 481 to prevent any lateral play between the pin and the remainder of the device. Vertical movement of the pin 481 is facilitated by the body portion opening 483 which permits the operator to grasp the pin and extend or retract the top end thereof. Once the pin is positioned in its desired location relative to the remainder of the alinement device, it is locked in place by the screw 485 which is threadedly received in the opening 487 disposed at right angles to the opening 479.

In use, the alinement device pin 481 is first set by disposing gage blocks on the gage block support 477 equal in height to the desired elevation of the top of the pin 481 above the body portion 475, that is, equal to the pitch radius (half of the diameter of the pitch circle) of the gear to be analyzed. An additional gage block is placed on top of the blocks already positioned so as to extend into the vertical path of the pin 481. The pin 481 is then elevated until its upper end engages with the bottom surface of the gage block last mentioned, and the pin is locked at this setting by screw 485. The alinement device is now ready for use and is located between the work support arms 297 and 298 and held in position by the operating head support centers 305 and 329, which are received in the setmaster centering holes 473.

With the locking handle 189 of the longitudinal carriage 155 released, the actuating knob 181 may be rotated to move the carriage forwardly or backwardly until the pin 481 lies in the focal plane of the comparator structure, and the locking handle 189 is then tightened.

Then the vertical carriage is raised upwardly or downwardly, as the case may be, by manipulating the handle 267, until the projected image of the upper end of the pin 481 is exactly on the pitch diameter line of the particular set of rack teeth chosen for use on the chart gauge, as seen in Fig. 32. In this figure, the pitch diameter line happens to be the horizontal center line of the chart gauge 83, but that is a mere coincidence and it does not necessarily follow. It will be understood that the chart gauge 83 contains many sets of rack teeth of different diametrical pitches, each with its own pitch diameter line, as seen in Fig. 8.

Figure 34:
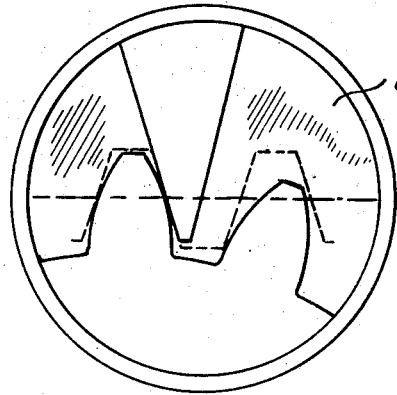
Figs. 33 and 34 are diagrammatic views of the chart gage with silhouettes of the gear and rack pin under certain conditions.

When the vertical carriage has been set so that the pin 481 has its top end exactly on the pitch diameter line of the chart, the vertical carriage is clamped by the clamping means 243 and no further vertical movement takes place, so long as gears of this same pitch diameter are being analyzed or tested or inspected. The set master 469 is now removed from the machine, and the rack tooth pin 457 is inserted and clamped in the clamp 459 (if not already present prior to the use of the setmaster) and is adjusted so that the projected image or silhouette of one side of the rack tooth pin coincides exactly on the tooth to be used in testing, as inscribed on the chart 83. This relationship of the parts is shown for example in Figs. 1, 7 and 34.

The gear to be tested, mounted on a suitable arbor or shaft, is now put in position (see Fig. 2 for example) between the centers 305 and 329 of the supporting arms 297 and 298. Two gears of different diameters and thicknesses, mounted on shafts or arbors of different lengths, are shown in dotted lines in Fig. 2, to illustrate the great flexibility of the apparatus in handling gears of different sizes. By suitable positioning of the arms 297 and 298, and by adjustment of the longitudinal carriage stop 185, the mounted gear, regardless of its size, is brought to a position where the rear face of the gear lies in the focal plane of the optical projection system, as seen in Fig. 2. The rack tooth pin 457 is also adjusted to lie in this same focal plane during the initial setting up of the test, and the pin remains in this focal plane when performing many of the tests. For testing the gear teeth at other points in the thickness of the gear, the pin is moved forwardly out of the focal plane to the desired point in the thickness of the gear, by moving the knob 381. This moves the pin out of focus on the screen, but still maintains the same lateral relationship of the parts because the movement is strictly parallel to the axis of the gear.

By moving the transverse carriage by means of the manipulating handle 121, the axis of the gear (as defined by the centers 305 and 329 on the arms 297 and 298) can be moved rightwardly or leftwardly relative to the optical axis of the light beam, and during such movement the teeth of the gear will engage with the rack tooth pin and the gear will actually roll on the pin, being turned by contact with the stationary pin, giving the same results as though the gear were in actual service or operating conditions, except for the factors of speed and load.

Figure 1:
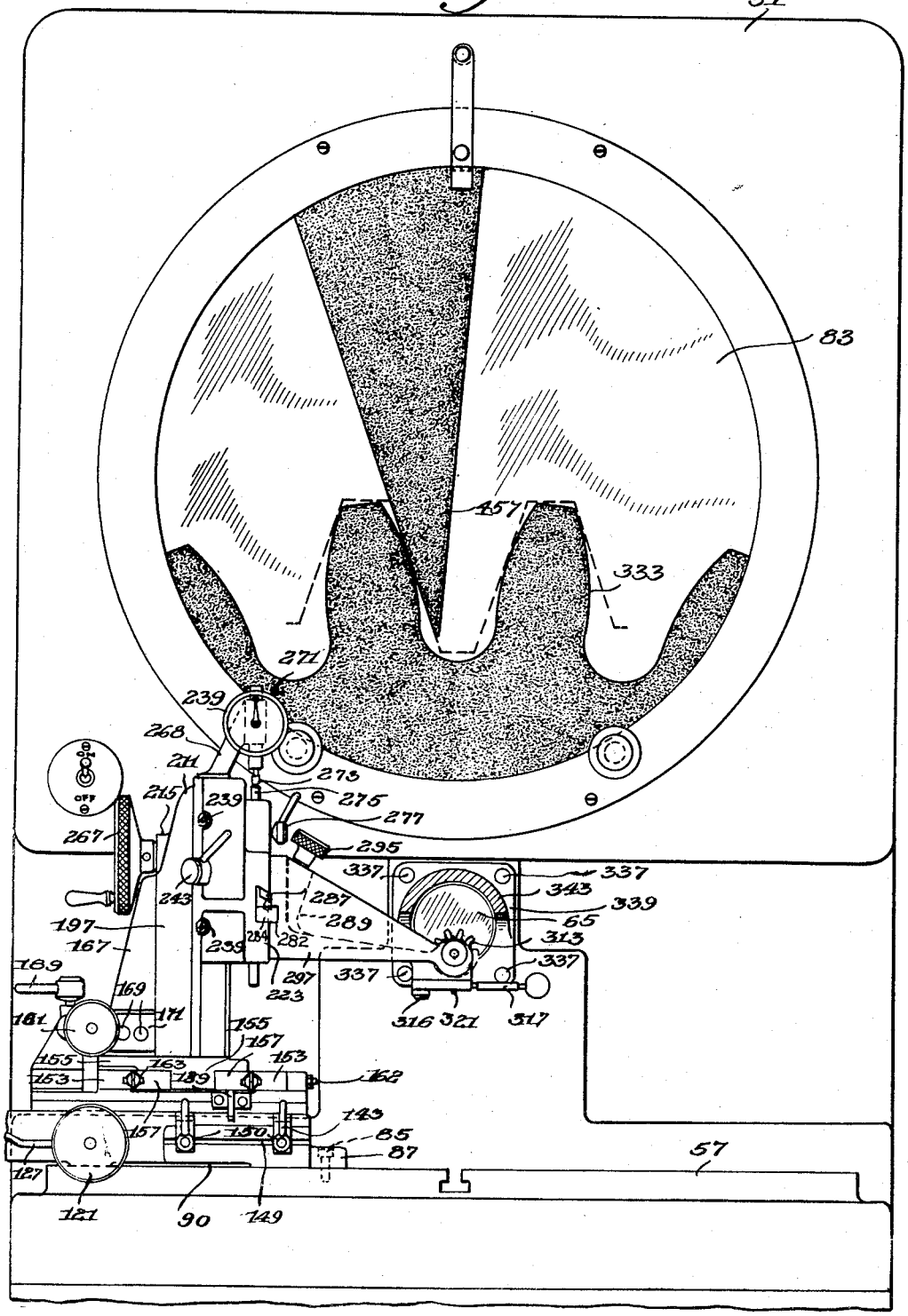
Fig. 1 is a front elevation of a portion of the gear analyzer showing the gear staging fixture supporting a gear, the magnified image of which is projected on a gear chart gage of an optical comparator.

By observing the shadow or projected outline of the next tooth of the gear to the one which is in contact with the rack pin, with relation to the inscribed outline of the rack tooth on the chart, one can see whether the gear rolls properly on the theoretical line simulated by the rack tooth pin. If the gear is perfect, then when one tooth bears on its right flank against the left edge of the rack tooth pin, as in Fig. 1, for example, the right flank of the next adjacent tooth should be exactly tangent to the inscribed line of the next adjacent rack tooth, as seen in Fig. 1. If there is any discrepancy, there is a defect in the theoretical gear shape, at least in the case of a normal standard gear. The dial indicator gauge 269 (Fig. 3) may be transferred from the position there indicated to a position on the bracket arm 417 (Fig. 24) and its plunger may be made to contact with the anvil portion 420 of the transverse carriage in order to determine the extent of transverse movement of the gear which is necessary to bring the gear tooth image into tangency with the inscribed rack tooth. This position of the indicator gage also enables measurement of the pitch arc of the gear.

Although the vertical carriage is not moved vertically during normal tests of the kind above indicated, yet it may be moved for certain special types of tests, as for example when determining whether the gear tooth has too much or too little addendum or dedendum. For example, starting from the position from the proper height as determined by the use of the setmaster, the vertical carriage may be raised to bring the top of the gear tooth outline up to the top of the intertooth space of the inscribed rack, this position being approximately the one shown in Fig. 7, and the dial indicator gauge 269, placed in the position shown in Fig. 3, may be used to measure the amount of such vertical movement of the vertical carriage. Or again, the vertical carriage may be raised until the silhouette of both flanks of the gear tooth are tangent to both flanks of the inscribed rack tooth, this being approximately the position shown in Fig. 34, and the amount of vertical movement necessary to achieve this may be measured.

Figure 33:
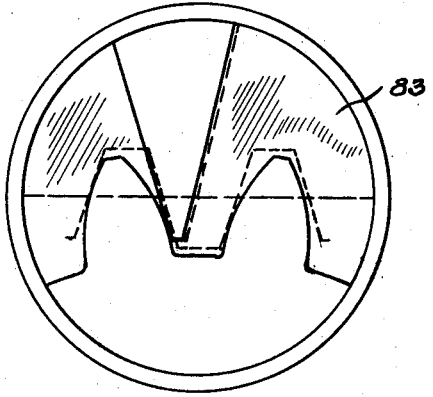

In making another possible test, the gear and its supporting carriage may be moved leftwardly (by knob 121) until the left flank of the tooth is tangent to the rack outline. Then the rack tooth pin may be moved laterally by manipulating the knob 413 (Fig. 24) until the pin engages the opposite flank of the same tooth, this position of the parts being shown in Fig. 33. This is one of the tests for determining the degree of back lash or looseness in the gear. In making this test, the dial indicator is mounted on the bracket 417 (Fig. 24) and the operating plunger thereof engages the anvil surface 420 of the rack pin carriage, to enable a reading of the lateral movement of the rack pin.

When the testing of one tooth is completed and it is desired to turn the gear to bring another tooth into engagement with the rack pin, this is easily done by grasping any convenient part of the upper carriage structure (e.g., the knob 181 or the flanges 167) and pulling it forward, against the force of the spring 158, until the gear lies forwardly of the rack pin 457 and can be turned without engaging the rack pin. Then when the gear has been turned to the desired extent, the forward pull on the carriage is released, and the spring 158 restores the carriage rearwardly to the previously set position determined by engagement of the adjustable stop 185 with the stationary anvil 192, in which position the rear face of the gear will again lie in the focal plane of the projector.

To those thoroughly familiar with gearing, the possibility of making various other tests will be apparent, and it will be observed that the present mechanism is one of great flexibility and adaptability, well suited to many different types of tests, and enabling the determination of various factors or conditions in gears which cannot be determined at all by prior testing means, or which can be determined only in a more awkward, cumbersome, and time consuming manner than is possible with the present apparatus.

It is seen from the foregoing disclosure that the above-mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. Gear analyzing means comprising an optical projector for illuminating an object in a focal plane and projecting a magnified image of the illuminated object onto a viewing plane, comparison chart means located at said viewing plane and containing a stationary magnified visible outline of a plurality of gear rack teeth of a gear rack adapted to mesh properly with a theoretically perfect example of the gear to be analyzed, means for holding a simulated rack tooth in stationary position substantially in said focal plane, means for holding a gear to be analyzed in position for rotation substantially in said focal plane and with one tooth of the gear in engagement with said simulated rack tooth, and means for shifting said gear holding means relatively to said comparison chart means in a direction laterally with respect to the rotary axis of the gear while maintaining engagement between said rack tooth and said tooth of the gear, so as to roll said gear against said rack tooth and to enable visual observation of the magnified images of other teeth of the rolling gear teeth than the gear tooth engaged by said simulated rack tooth with relation to the outline of said gear rack teeth on said comparison chart means.

2. The method of analyzing a gear which comprises the steps of providing a chart with a magnified visible permanent outline of a portion of a gear rack designed to mesh with a perfect gear of the kind being analyzed, providing a simulated rack tooth member and optically projecting a magnified outline thereof onto said chart in congruent relation to a corresponding portion of said visible outline on said chart, providing a gear to be analyzed, locating one tooth of the gear to be analyzed in contact with said rack tooth member, moving the gear to be analyzed to roll the engaged tooth thereof on said rack tooth member, optically projecting a magnified outline of the engaged gear tooth and an adjacent gear tooth onto said chart while the gear is rolling on said rack tooth member, and observing the projected magnified outlines of the rolling gear teeth with relation to the visible outline of said gear rack on said chart.

3. A gear analyzer comprising an optical projector for illuminating an object in a focal plane and projecting a magnified image of the illuminated object onto a viewing plane, comparison chart means located at said viewing plane and containing a stationary magnified visible outline of a plurality of gear rack teeth adapted to mesh properly with a theoretically perfect example of a gear to be inspected, a gear staging device, said staging device including an operating member and a support member, said operating member being adapted to rotatably support the gear to be inspected in said focal plane, said support member supporting a single standard partial rack tooth in stationary position in said focal plane so as to be adapted to mesh with one tooth of said gear to be inspected, means on said support member and operating member for orienting said partial rack tooth and gear with respect to the outline of said gear rack teeth on said comparison chart means and for engaging said gear with said partial rack tooth, said operating member being provided with means for moving said gear bodily relative to said partial rack tooth, said movement causing said gear to be rotated by said partial rack tooth so that the projected image of a non-engaged tooth of said gear to be inspected other than the tooth engaged by said partial rack tooth may be compared with outline of one of said gear rack teeth on said comparison chart means.

4. A construction as defined in claim 3, wherein calibrated means are provided on said operating member and support member for measuring inaccuracies between the projected image of said gear to be inspected and the outline of said gear rack teeth on said comparison chart means.

5. The combination with an optical comparator of the type having a substantially horizontal bed, a substantially vertical wall having a light window therein, light projecting means for projecting a beam of light across said bed above the surface thereof and into said window, and means for magnifying and projecting said beam of light onto a screen, of means mounted on said vertical wall and extending therefrom in cantilever fashion for holding a simulated standard partial rack tooth in stationary position in said beam of light, means mounted on said bed for rotatably holding a gear to be inspected with a portion thereof in said beam of light and with a tooth of said gear engaged with said partial rack tooth, a comparison chart carried by said screen and having a stationary magnified visible outline of at least two gear rack teeth of a gear rack adapted to mesh properly with a theoretically perfect example of the gear to be inspected, said partial rack tooth being alined with a portion of the outline of one of said gear rack teeth on said comparison chart, means for moving said gear to be inspected bodily in a direction across said bed and substantially transverse to said beam of light to roll the engaged tooth of said gear on said partial rack tooth, the projected image of a non-engaged tooth on said gear to be inspected adjacent to said engaged tooth being compared with the outline of another of said gear rack teeth on said comparison chart adjacent to the outline of said one tooth with which said partial rack tooth is alined.

6. The combination with an optical comparator of the type having a substantially horizontal bed, a substantially vertical wall having a light window therein, light projecting means for projecting a beam of light across said bed above the surface thereof and into said window, and means for magnifying and projecting said beam of light onto a screen, of means mounted of said vertical wall and extending therefrom in cantilever fashion for holding a simulated partial gear tooth in a stationary position in said beam of light, means mounted on said bed for rotatably holding a gear to be inspected with a portion thereof in said beam of light and with a tooth of said gear engaged with said partial gear tooth, a comparison chart carried by said screen and having a stationary magnified visible outline of at least two gear teeth of a gear adapted to mesh properly with a theoretically perfect example of the gear to be inspected, means for orienting said partial gear tooth and gear to be inspected with the outline of said gear teeth on said comparison chart, means for moving the gear to be inspected bodily in a direction across said bed and substantially transverse to said beam of light to roll the engaged tooth of said gear to be inspected on said partial gear tooth, the projected image of a non-engaged tooth on the gear to be inspected adjacent to said engaged tooth being compared with the outline of another of said gear teeth on said comparison chart adjacent to the outline of said one tooth with which said partial gear tooth is alined.

7. A gear inspection unit comprising, in combination, an optical screen including a gear form chart gage, said chart gage having a visible stationary magnified outline of at least one set of gear teeth of a gear rack adapted to mesh properly with a theoretically perfect example of a gear to be inspected, said chart gage further including a pitch diameter line for said set of gear teeth, means for projecting a beam of light toward said screen, an operating member having means for supporting the gear to be inspected at least partially in said beam of light so that an image thereof will appear on said gear form chart gage, and an alinement device for positioning said operating member, said alinement device including a body portion having coaxial support receiving ends adapted to be removably mounted on said operating member, a table formed on said body portion and adapted to support gage blocks built up to a height corresponding to the pitch radius of the gear to be inspected, a pin adjustably mounted in said body portion at approximately right angles to said table to be elevated to a height corresponding to that of the built up gage blocks, said operating member having means for adjusting the position of said alinement device so that the projected image of the top of said pin is made to coincide with said pitch diameter line on said chart gage, whereby said operating member is correctly positioned when said alinement device is removed and replaced by the gear to be inspected.

8. A gear analyzer comprising an optical projector for illuminating an object in a focal plane and projecting a magnified image of the illuminated object onto a viewing plane, a comparison chart located at said viewing plane and containing stationary magnified outlines of a plurality of sets of gear rack teeth adapted to mesh properly with a theoretically perfect example of a gear to be inspected for each of said sets, said sets of gear rack teeth being nested and each having the same pressure angle but different diametrical pitches so that various gears to be inspected may be accommodated regardless of the diameter and the number of teeth thereon, means for holding a single standard half-rack pin in stationary position substantially in said focal plane, said half-rack pin being used with all of said gears to be inspected, means for holding a gear to be inspected in position for rotation substantially in said focal plane and with one tooth of said gear engaged with said half-rack pin, said half-rack pin being alined with a portion of the outline of one of said sets of gear rack teeth, and means for shifting said gear holding means laterally with respect to the rotary axis of said gear while maintaining engagement between said half-rack pin and said engaged tooth of said gear, so as to roll said gear against said half-rack pin and to enable visual observation of the magnified images of other teeth of said rolling gear than said engaged tooth with relation to the outline of the appropriate one of said sets of gear rack teeth on said comparison chart.

References Cited in the file of this patent

UNITED STATES PATENTS

| | | |
|---|---|---|
| 1,480,390 | Hartness | Jan. 8, 1924 |
| 1,732,730 | Porter et al. | Oct. 22, 1929 |
| 1,753,014 | Loque | Apr. 1, 1930 |
| 1,884,368 | Swain | Oct. 25, 1932 |
| 2,013,365 | Snarry | Sept. 3, 1935 |
| 2,079,323 | Kokotiok | May 4, 1937 |
| 2,122,898 | Swartz | July 5, 1938 |
| 2,197,308 | Kolb et al. | Apr. 16, 1940 |
| 2,235,832 | Freeman | Mar. 25, 1941 |
| 2,287,677 | Fraumann | June 23, 1942 |
| 2,380,567 | Yawitz et al. | July 31, 1945 |
| 2,387,210 | Wood et al. | Oct. 16, 1945 |
| 2,398,139 | Freeman | Apr. 9, 1946 |
| 2,487,314 | Coles | Nov. 8, 1949 |
| 2,510,998 | O'Brien | June 13, 1950 |
| 2,571,853 | Fontecchio | Oct. 16, 1951 |
| 2,580,239 | Murch et al. | Dec. 25, 1951 |
| 2,601,965 | Scalise | July 1, 1952 |
| 2,635,345 | Samborski | Apr. 21, 1953 |
| 2,682,710 | Crosby | July 6, 1954 |